United States Patent [19]

Tokunaga et al.

[11] Patent Number: 5,840,085
[45] Date of Patent: Nov. 24, 1998

[54] PROCESS FOR REMOVING SODIUM CHLORIDE AND POTASSIUM SALTS FROM ASH COLLECTED FROM A SODA RECOVERY BOILER

[75] Inventors: Kikuo Tokunaga; Masakazu Tateishi; Michimasa Yagi; Takayuki Maeda, all of Nagasaki; Yoshihisa Arakawa, Tokyo, all of Japan

[73] Assignee: Mitsubishi Jukogyo Kabushiki Kaisha, Tokyo, Japan

[21] Appl. No.: 538,790

[22] Filed: Oct. 3, 1995

[30] Foreign Application Priority Data

Dec. 15, 1994 [JP] Japan .................................. 6-311462

[51] Int. Cl.$^6$ .............................. B01D 9/02; C01D 5/16
[52] U.S. Cl. ...................... 23/297; 23/302 R; 23/302 T; 162/30.11; 423/208
[58] Field of Search .................................. 23/297, 302 R, 23/302 T, 303; 423/199, 202, 208, 551, DIG. 3; 162/30.11, 37

[56] References Cited

U.S. PATENT DOCUMENTS

| 1,182,668 | 5/1916 | Firebaugh | 423/199 |
|---|---|---|---|
| 1,853,275 | 4/1932 | Houghton et al. | 23/297 |
| 2,970,890 | 2/1961 | James | 423/199 |
| 4,724,130 | 2/1988 | Statnick et al. | 423/208 |
| 5,126,019 | 6/1992 | Rutherford et al. | 23/302 T |
| 5,302,246 | 4/1994 | Nykanen et al. | 162/31 |
| 5,549,788 | 8/1996 | Nykanen et al. | 162/31 |
| 5,562,807 | 10/1996 | Tuominiemi et al. | 423/DIG. 3 |

FOREIGN PATENT DOCUMENTS 47-20452  6/1972  Japan ..................................... 423/551

*Primary Examiner*—Gary P. Straub
*Attorney, Agent, or Firm*—Bell Seltzer Intellectual Property Law Group of Alston & Bird LLP

[57] ABSTRACT

This invention relates to a process for removing sodium chloride and potassium salts, which are impurities concentrated and accumulated in pulp digesting chemicals, from ash collected from a soda recovery boiler. This process comprises the steps of (a) mixing ash collected from the combustion exhaust gas of the soda recovery boiler with water to form a slurry, adjusting the pH of the slurry to 10 or less by the addition of sulfuric acid, adjusting the temperature of the slurry to 20° C. or above, and holding the slurry at that temperature for a sufficient time to cause sodium chloride and potassium salts present in the collected ash to be dissolved in the water; (b) cooling the slurry to a temperature below 20° C. by the addition of ice and/or water so as to precipitate solid matter therefrom; and (c) separating the slurry into solid and liquid components and recovering the solid component while discharging the liquid component out of the system.

3 Claims, 3 Drawing Sheets

FIG. I 5,840,085

PROCESS FOR REMOVING SODIUM CHLORIDE AND POTASSIUM SALTS FROM ASH COLLECTED FROM A SODA RECOVERY BOILER

BACKGROUND OF THE INVENTION

1. Field of the Invention

This invention relates to soda recovery boilers used in pulp mills. More particularly, it relates to a process for removing sodium chloride and potassium salts, which are impurities concentrated and accumulated in pulp digesting chemicals, from ash collected from combustion exhaust gas.

2. Description of the Related Art

Impurities present in pulp digesting chemicals, such as sodium chloride and potassium salts, are chiefly derived from pulpwood. Some of these impurities are carried away from the chemical recovery system by the pulp formed as a product and chemicals escaping from the system. However, with the development of increasingly closed chemical recovery systems and the resulting rise in the recovery of the chemicals, they tend to be concentrated and accumulated in the chemical recovery system.

It is well known that concentrated and accumulated sodium chloride and potassium salts not only act as inert substances which increase the circulation load of the chemicals and cause a reduction in economical efficiency due to an increased dead load, but also significantly enhance the corrodibility of the chemical recovery system. Especially in a sodium recovery boiler for burning spent liquor, the presence of sodium chloride and potassium salts enhances the corrodibility of the heat transfer tubes in the hot section of the boiler. Moreover, it significantly increases the adherence of combustion ash to the surfaces of the heat transfer tubes and thereby increases the pressure loss in the flue of the soda recovery boiler, leading eventually to interference with the continuous operation of the boiler.

Although no process for removing potassium salts from pulp digesting chemicals has conventionally been used for practical purposes, an analogous process for removing sodium chloride is known. According to this process, ash collected from the exhaust gas of a soda recovery boiler is formed into a slurry with the aid of small amounts of water and circulating liquid, the resulting slurry is heated to 60°–70° C. so as to dissolve sodium chloride in the water, and the solid matter present in the slurry is then separated and recovered.

This process can easily remove sodium chloride from such chemicals. However, if this process is employed to remove potassium salts having low solubility, a considerable chemical loss is caused because $Na_2SO_4$ that is a useful component is lost at the same time.

SUMMARY OF THE INVENTION

It is an object of the present invention to provide a process for removing sodium chloride and potassium salts which are concentrated and accumulated in the pulp digesting chemical recovery system.

To this end, the present invention provides a process for removing sodium chloride and potassium salts from ash collected from a soda recovery boiler which comprises the steps of (a) mixing ash collected from the combustion exhaust gas of the soda recovery boiler with water to form a slurry, adjusting the pH of the slurry to 10 or less, adjusting the temperature of the slurry to 20° C. or above, and holding the slurry at that temperature for a sufficient time to cause sodium chloride and potassium salts present in the collected ash to be dissolved in the water; (b) cooling the slurry to a temperature below 20° C. so as to precipitate solid matter therefrom; and (c) separating the slurry into solid and liquid components and recovering the solid component while discharging the liquid component out of the system.

As described above, the conventional process for removing sodium chloride involves the removal of sodium chloride by bringing ash collected from a soda recovery boiler into contact with a small amount of water at 60°–70° C. However, in the case of potassium salts having low solubility in water, the addition of a sufficient amount of water to remove them to the desired extent causes the dissolution of an increased amount of sodium sulfate that is a useful component, resulting in poor economy.

According to the present invention having the removal of potassium salts for its main object, collected ash is mixed with water to form a slurry and the pH of the slurry is adjusted to 10 or less (preferably 10–7) by neutralization with sulfuric acid, so that most of the carbonates contained in the collected ash consisting chiefly of sulfates are converted into sulfates. Thus, the potassium and sodium contained in the collected ash are dissolved in the form of potassium sulfate and sodium sulfate. During this process, the collected ash releases or evolves its sensible heat, heat of solution, heat of neutralization, and other heat. Accordingly, the temperature of the slurry is adjusted to 20° C. or above (preferably about 30° C. at which the solubility of $Na_2SO_4$ is not substantially reduced) by use of industrial water or the like. Then, by the addition of ice and/or water, the slurry is cooled to a low temperature below 20° C. (generally lower than 20° C. but not lower than 10° C.) at which the solubility of sodium sulfate is low and, therefore, no substantial chemical loss is caused. This makes it possible to precipitate, separate and recover sodium sulfate while dissolving and removing potassium sulfate. Thus, when collected ash is dissolved in water at a temperature of 20° C. or above (preferably about 30° C.) and the resulting aqueous solution is then cooled to a temperature below 20° C. by the addition of ice and/or water, the degree of supersaturation of the solution can be enhanced to promote the precipitation of coarse crystals. The crystals so precipitated have such a large grain size that they can subsequently be separated and recovered with ease.

Generally, if ash collected from a recovery boiler is directly brought into contact with cold water, undissolved coarse particles tend to remain and slurry handling operations such as stirring and pumping are difficult. However, if the slurry is first adjusted to a temperature of 20° C. or above and then cooled to a low temperature below 20° C. as taught by the present invention, slurry handling is easy because the collected ash has once been dissolved.

It is another object of the present invention to achieve a substantial reduction in cooling cost in the above-described process for removing sodium chloride and potassium salts.

Specifically, the process of the present invention involves a first stage in which electrostatically precipitated ash (hereinafter referred to as "EP ash") is mixed with water and the resulting slurry is neutralized and adjusted to a temperature of 20° C. or above (preferably about 30° C.), and a second stage in which the slurry is placed in a cooling vessel and cooled to a temperature below 20° C. by a suitable cooling means (e.g., by the addition of ice and/or water) so as to precipitate crystals, followed by solid-liquid separation. In this process, the sensible heat, heat of solution, heat of neutralization, and other heat carried into or evolved in the first stage by the EP ash may be removed by heat exchange with ordinary cooling water, and only the heat of crystallization evolved in the second stage needs to be cooled to a temperature below 20° C. by the addition of ice and/or water. Thus, the cooling cost can be substantially reduced by removing the sensible heat, heat of solution, heat of neutralization, and other heat of the EP ash by cooling with cooling water such as ordinary industrial water.

The process of the present invention has proved to have the following effects.

(1) By removing sodium chloride and potassium salts from ash collected from the exhaust gas of a recovery boiler, the concentrations of chlorine and potassium present in the chemical recovery system can be reduced. As a result, the adherence of combustion ash to the flue of the recovery boiler is decreased, so that the continuous operation period which has conventionally been 3 months or so can be extended to 6–12 months.

(2) At the same time, the amount of steam consumed for purposes of soot blowing to remove the ash adhering to the heat transfer surfaces can be decreased remarkably.

(3) The removal of sodium chloride and potassium salts cancels a reduction in the melting point of attached ash, thereby mitigating corrosion of the heat transfer tubes in the hot section of the boiler. Thus, the corrodibility of various parts of the recovery boiler are improved, as evidenced by the fact that the lifetime of the smelt spout is prolonged about threefold.

(4) The power consumption of the cooler is reduced by half as a result of cooling with water, resulting in a substantial cutdown in cooling cost.

DETAILED DESCRIPTION OF PREFERRED EMBODIMENTS

Figure 1:
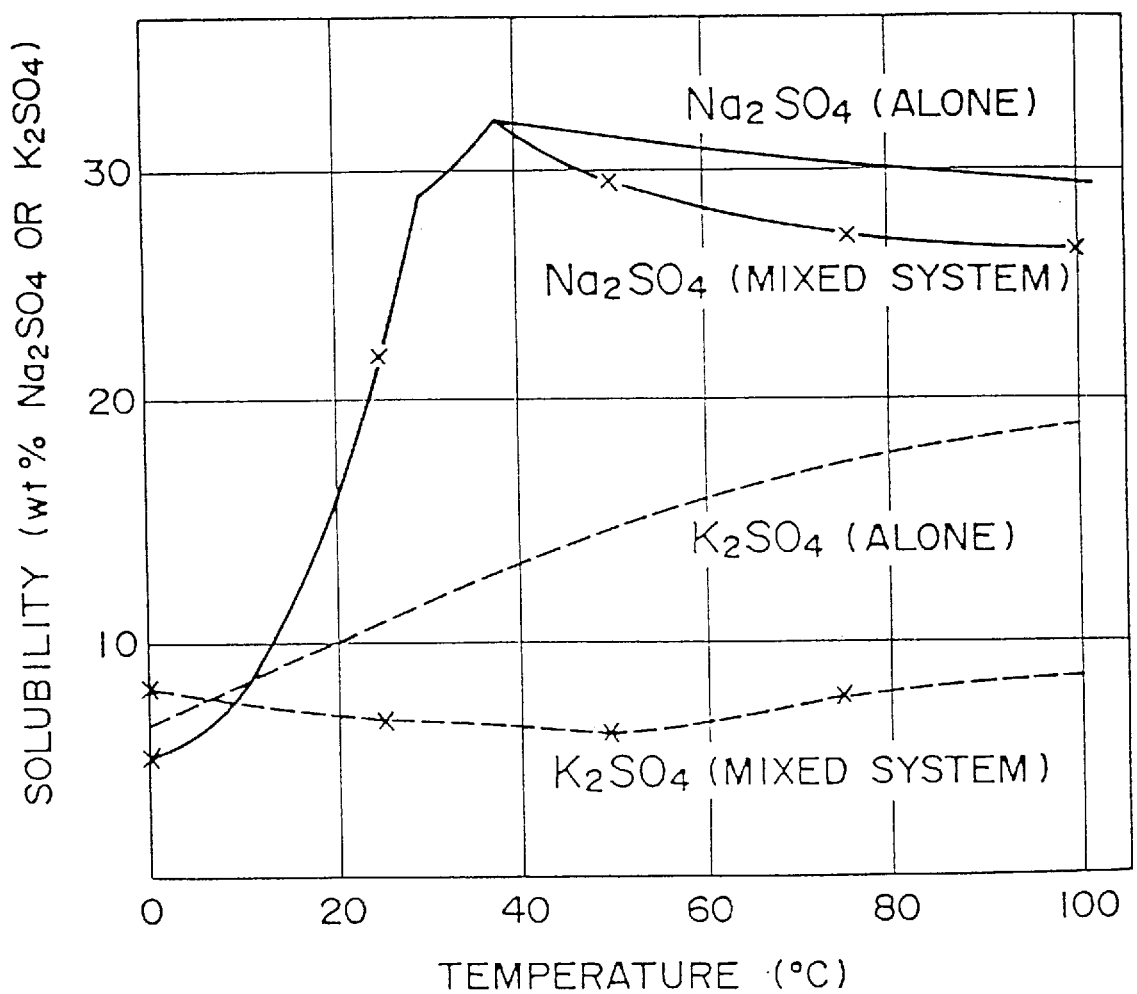
FIG. 1 is a graph showing the solubilities of $Na_2SO_4$ and $K_2SO_4$ in a $Na_2SO_4$—$K_2SO_4$ mixed system and the solubilities of $Na_2SO_4$ and $K_2SO_4$ when each of them is present alone.

FIG. 1 is a graph in which the solubilities of $Na_2SO_4$ and $K_2SO_4$ in a $Na_2SO_4$—$K_2SO_4$ mixed system are plotted against temperature. In FIG. 1, $Na_2SO_4$ (mixed system) and $K_2SO_4$ (mixed system) indicate the solubility curves of $Na_2SO_4$ and $K_2SO_4$ in a $Na_2SO_4$—$K_2SO_4$ mixed system, and $Na_2SO_4$ (alone) and $K_2SO_4$ (alone) indicate the solubility curves of $Na_2SO_4$ and $K_2SO_4$ when each of them is present alone. As can be seen in FIG. 1, the solubility of $K_2SO_4$ shows little variation with temperature, whereas the solubility of $Na_2SO_4$ varies greatly with temperature. More specifically, the solubility of $Na_2SO_4$ decreases remarkably at low temperatures.

Now, let us suppose that certain amounts of collected ash having the same composition of the above-described mixed system are used to prepare slurries having temperatures of 80° C. and 10° C. In the preparation of these slurries, the amount of water added is varied so as to cause the same amount of $Na_2SO_4$ to be dissolved in the water. Then, in the slurry at 80° C., the amount of $K_2SO_4$ dissolved is only about one-fourth the amount of $Na_2SO_4$ dissolved. In the slurry at 10° C., however, the amount of $K_2SO_4$ dissolved is almost equal to the amount of $Na_2SO_4$ dissolved. The amount of $K_2SO_4$ remaining in the solid matter present in the slurry decreases when more $K_2SO_4$ is dissolved relative to $Na_2SO_4$. Accordingly, the $K_2SO_4$ content in the solid matter present in the slurry at 10° C. is about one-fourth of that in the solid matter present in the slurry at 80° C.

However, if ash collected from a recovery boiler is directly brought into contact with cold water, undissolved coarse particles tend to remain and slurry handling operations such as stirring and pumping are difficult. In contrast, if the slurry is first adjusted to a temperature of 20° C. or above (preferably about 30° C. at which the solubility of $Na_2SO_4$ is not substantially reduced) and then cooled to a temperature of less than 20° C. by the addition of ice and/or water as taught by the present invention, slurry handling is easy because the collected ash has once been dissolved.

In the above procedure, collected ash (i.e., EP ash) is once dissolved in water and then crystallized. During dissolution, salts (in particular, $Na_2CO_3$ and the like) present in the EP ash evolves a large amount of heat of solution as represented by the following equations.

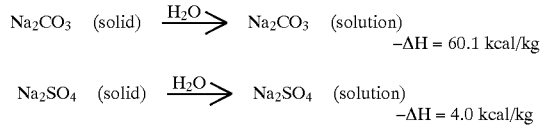

Figure 2:
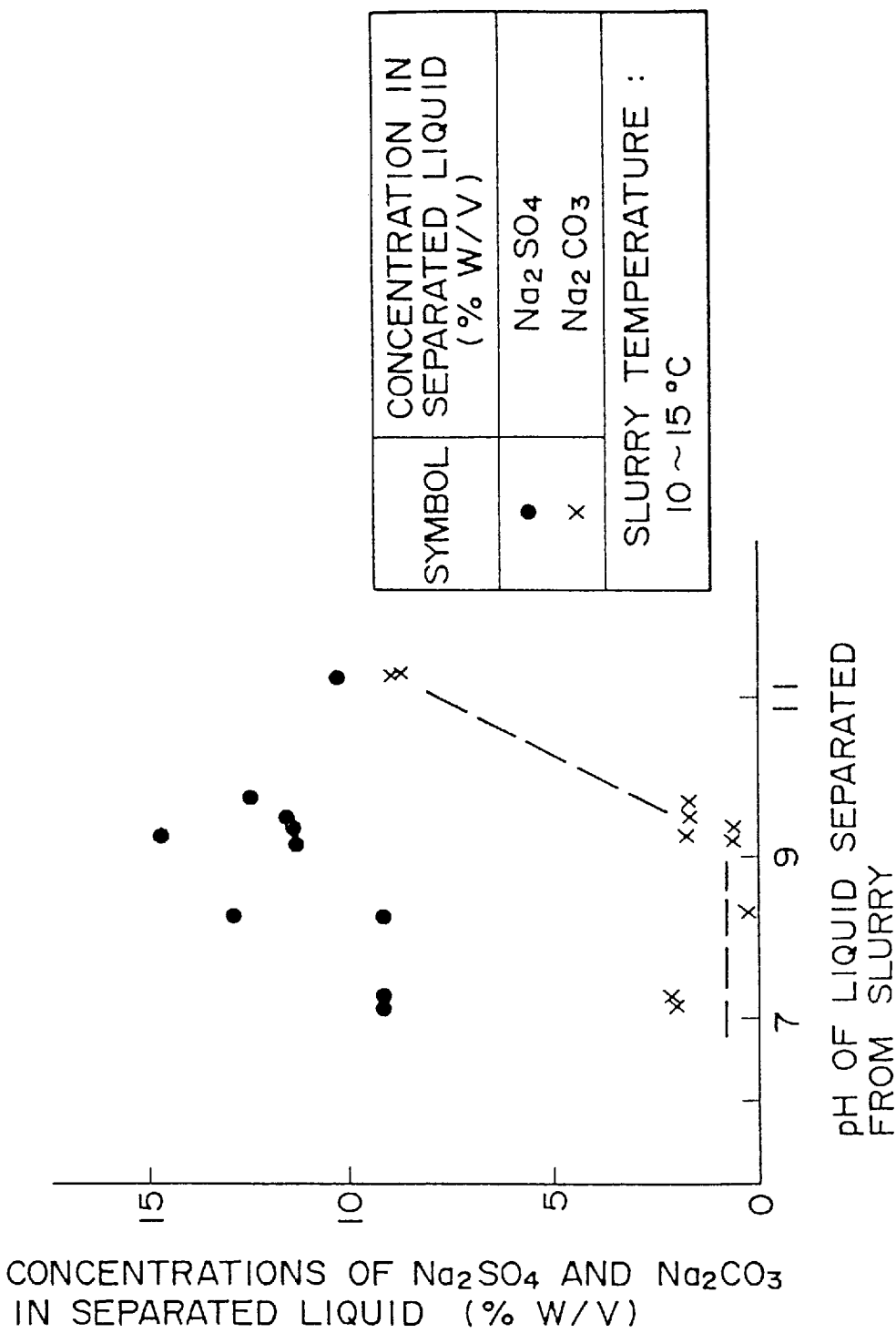
FIG. 2 is a graph showing the relationship between the pH of the liquid separated from the slurry and the $Na_2SO_4$ and $Na_2CO_3$ concentrations in the liquid.

FIG. 2 shows the relationship between the pH of the liquid separated from the slurry and the concentrations of $Na_2CO_3$ and $Na_2SO_4$ in the liquid. As the concentration of $Na_2CO_3$ in EP ash is increased, the pH of the slurry is raised and an increased amount of $Na_2CO_3$ is dissolved, resulting in a reduction in the overall recovery of Na. In order to avoid this, the pH of the slurry needs to be neutralized to 10 or less as can be seen from FIG. 2. During this neutralization, a large amount of heat of neutralization is evolved as represented by the following equation.

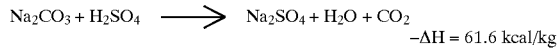

Moreover, since EP ash is recovered in a temperature region corresponding to an exhaust gas temperature of about 200° C., a large amount of sensible heat is also carried into the slurry by the EP ash.

Accordingly, if a slurry having a temperature below 20° C. is formed to precipitate crystals, all of the sensible heat, heat of solution, heat of neutralization, heat of crystallization, and other heat of the EP ash must be removed by means of an expensive refrigerant cooled to a temperature below 20° C. by a cooler, resulting in an increased cooling cost.

In contrast, the process of the present invention involves a first stage in which EP ash is mixed with water and the resulting slurry is neutralized and adjusted to a temperature of 20° C. or above (preferably about 30° C.), and a second stage in which the slurry is cooled to a temperature below 20° C. by the addition of ice and/or water so as to precipitate crystals and, followed by solid-liquid separation. In this process, the sensible heat, heat of solution, heat of neutralization, and other heat carried into or evolved in the first stage by the EP ash may be removed by heat exchange with ordinary cooling water, and only the heat of crystallization evolved in the second stage needs to be cooled to a temperature below 20° C. by the addition of ice and/or water. Thus, the cooling cost can be substantially reduced by removing the sensible heat, heat of solution, heat of neutralization, and other heat of the EP ash by cooling with cooling water such as ordinary industrial water.

Moreover, the effects of the process of the present invention become more pronounced as the concentration of $Na_2CO_3$ in EP ash is increased. Furthermore, since an aqueous solution of collected ash is first prepared at a temperature of 20° C. or above and then cooled to a temperature below 20° C., the degree of supersaturation of the solution can be enhanced to promote the precipitation of coarse $Na_2SO_4$ crystals.

Figure 3:
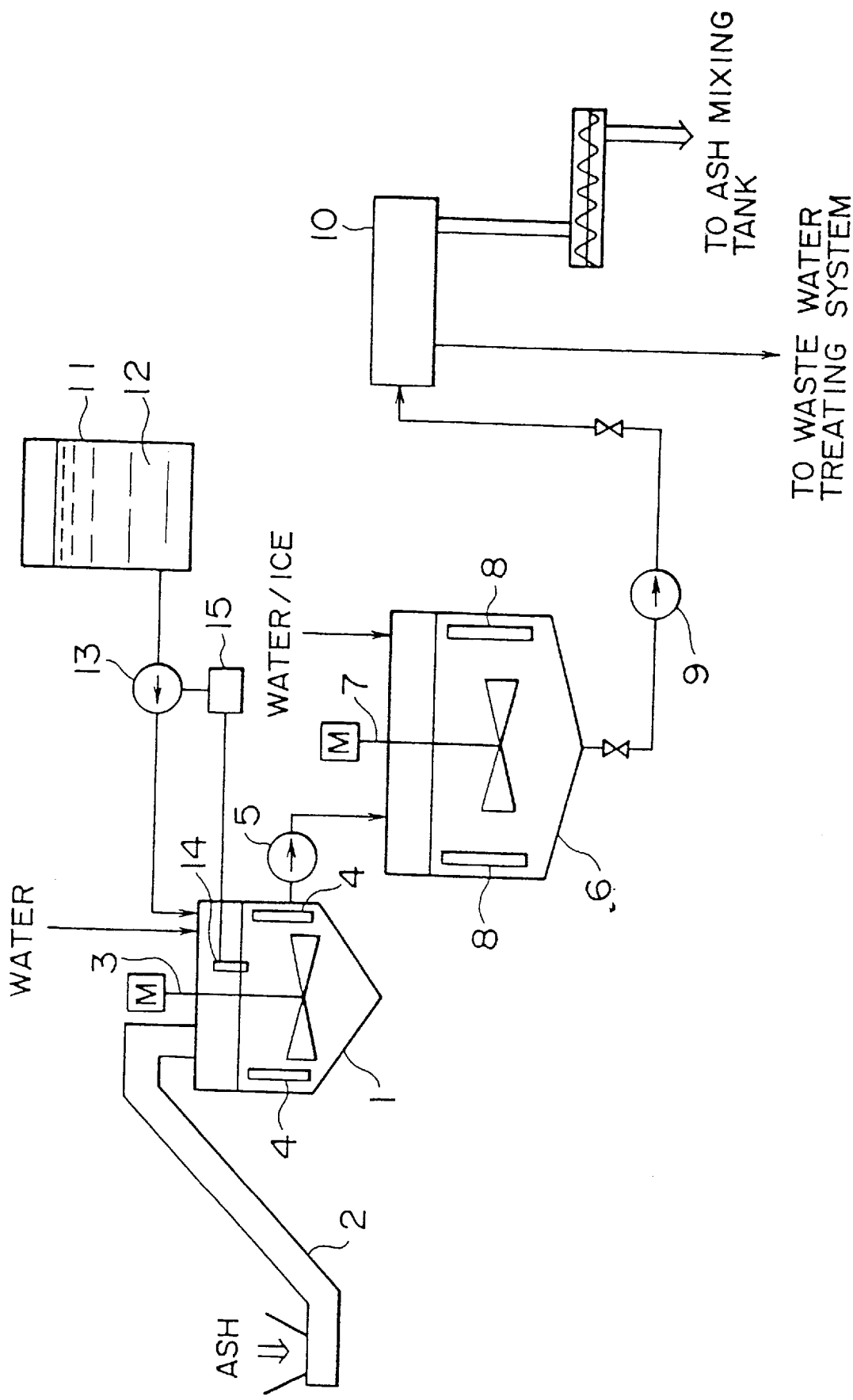
FIG. 3 is a schematic flow diagram for explaining an example of the present invention.

An example of the present invention is described with reference to FIG. 3. Ash collected by an electrostatic precipitator, which was composed, in percent by weight, of 9.7% NaCl, 67.2% $Na_2SO_4$, 10.1% $Na_2CO_3$, 1.5% KCl, 9.9% $K_2SO_4$ and 1.6% $K_2CO_3$, was continuously charged from a conveyor 2 into a first stirred tank 1 at a rate of 1.0 ton per hour. In parallel therewith, water was fed to first stirred tank 1 at a rate of 1.0 ton per hour.

In first stirred tank 1, its contents were vigorously stirred with a stirrer 3 to mix the collected ash and water intimately and thereby form a slurry. During this period, the temperature of the slurry within first stirred tank 1 was maintained at 30° C. by means of a heat exchanger 4 using cooling water. Since the resulting slurry exhibited a pH of 10 or above owing to the presence of $Na_2CO_3$, the pH of the slurry was adjusted to 9 by supplying dilute sulfuric acid 12 from a dilute sulfuric acid tank 11 to first stirred tank 1 by means of an injection pump 13 which was controlled by a pH regulator 15 in response to the indication of a pH meter 14. Thus, most of the $Na_2CO_3$ present in the slurry was converted into $Na_2SO_4$. After the slurry was allowed to stay there for 1–2 hours, it was transferred to a second stirred tank 6 by means of a pump 5 at a rate of about 2.0 tons per hour.

Then, water or ice was supplied to second stirred tank 6 in a total amount of about 1 ton per hour. While being gently stirred by means of a stirrer 7, the slurry was allowed to stay there for 4–8 hours so as to promote the crystal growth of $Na_2SO_4$. During this period, the temperature of the slurry within second stirred tank 6 was maintained at 15° C. by the supply of ice and the use of a cooler 8.

Thereafter, the slurry within second stirred tank 6 was transferred to a decanter 10 by means of a pump 9 at a rate of about 3.0 tons per hour, where solid matter present in the slurry was separated. As a result, sludge and separated liquid were obtained in amounts of 2.1 tons per hour and 0.9 ton per hour, respectively. The separated liquid (0.9 ton per hour) was diluted with water and transferred to a waste water treating system installed in the plant. The sludge (2.1 tons per hour) consisted of 0.9 ton per hour of solid matter and 1.2 tons per hour of crystal water and attached water. This sludge was dried as required and returned to a $Na_2SO_4$ mixing tank.

In this example, the recovery of $Na_2SO_4$ was about 85%, the degree of removal of potassium salts such as KCl and $K_2SO_4$ was about 95%, and the degree of removal of NaCl was about 97%.

Next, on the assumption that 1 ton of EP ash (at 150° C.) containing 15% $Na_2CO_3$ (with the balance being assumed to be 85% $Na_2SO_4$) is mixed with 2 tons of water and the resulting slurry is cooled to 15° C., the amount of heat to be removed was calculated with respect to the case in which the slurry is cooled by a cooler alone and the case in which cooling water and a cooler are used in combination according to the preferred embodiment of the present invention. The results thus obtained are comparatively shown in Table 1 below.

TABLE 1

| | Cooling with cooling water (kcal) | | | | Cooling by a cooler (kcal) | | | | | |
|---|---|---|---|---|---|---|---|---|---|---|
| | EP ash | | | | EP ash | | | | | |
| | Sensible heat | Heat of solution and neutralization of $Na_2CO_3$ | Heat of solution of $Na_2SO_4$ | Total | Sensible heat | Heat of solution and neutralization of $Na_2CO_3$ | Heat of solution of $Na_2SO_4$ | Heat of slurry formation | Feedwater Sensible heat | Total |
| When a cooler alone is used | — | — | — | 0 | 1000 × 0.3 × (150–15) 40,500 | 1000 × 0.15 × (60.1 + 61.6) 18,255 | 1000 × 0.85 × 4.0 3,400 | 1000 × 45.7 45,700 | 2000 × (25–15) 20,000 | 127,855 |
| When cooling water and a cooler are used in combination | 1000 × 0.3 × (150–25) 37,500 | 1000 × 0.15 × (60.1 + 61.6) 18,255 | 1000 × 0.85 × 4.0 3,400 | 59,155 | 1000 × 0.3 × (25–15) 3,000 | — 0 | — 0 | 1000 × 45.7 45,700 | 2000 × (25–15) 20,000 | 68,700 |

In the calculations shown in Table 1, the measured values given in Table 2 below were used.

TABLE 2

| For EP ash | Temperature: 150° C. |
|---|---|
| | Specific heat: 0.3 kcal/kg |
| For $Na_2CO_3$ | Heat of solution: 60.1 kcal/kg |
| | Heat of neutralization: 61.6 kcal/kg |
| For $Na_2SO_4$ | Heat of solution: 4.0 kcal/kg |
| For feedwater | Temperature: 25° C. |
| For slurry | Water-cooled slurry: 25° C. |
| | Cooled slurry: 15° C. |
| | Heat of slurry formation: 45.7 kcal/kg |

It is evident from Table 1 that, according to the process of the present invention in which cooling water and a cooler are used in combination, about one-half of the total heat to be removed (59155/127855×100=46.3%) is cooled with inexpensive cooling water and the remainder is cooled by a cooler, resulting in a substantial cutdown in cooling cost.

We claim:

1. A process for treating the ash from a soda recovery boiler, the ash made from predominantly sodium sulfate admixed with sodium carbonate, sodium chloride, potassium chloride, potassium carbonate, comprising the steps of:
   (a) converting most of the carbonate in said ash to sulfate by adding an amount of water and sulfuric acid, while maintaining the temperature of the slurry above about 30° C.,
   the amount of water sufficient to dissolve a portion of the sodium salts and a majority of the potassium and chloride salts to form a slurry;
   (b) creating a mother liquor and cooling the solution to a temperature below 20° C. by adding water and/or ice to precipitate sodium sulfate dihydrate or heptahydrate, without precipitating potassium chloride, sodium chloride, and potassium sulfide; and
   (c) separating the sodium sulfate dihydrate or heptahydrate formed in step (b) and discharging the mother liquor containing a majority of chloride salts and potassium salts from the system.

2. A method according to claim 1, wherein said step of converting the carbonate in the ash to sulfate further comprises adjusting pH of the slurry to from 7 to 10 inclusive.

3. A process for removing potassium salts from ash collected from a soda recovery boiler which comprises the steps of:
   (a) mixing ash collected from the combustion exhaust gas of the soda recovery boiler with water to form a slurry, adjusting a pH of the slurry to from 7 to 10 by the addition of sulfuric acid, adjusting the temperature of the slurry to about 30° C. or above, and holding the slurry at that temperature for a sufficient time to cause potassium salts present in the collected ash to be dissolved in the water;
   (b) cooling the slurry to a temperature below 20° C. by adding water and/or ice to precipitate sodium sulfate dihydrate or heptahydrate therefrom and leaving other alkali metal salts in solution; and
   (c) separating the sodium sulfate dihydrate or heptahydrate formed in step (b) and discharging the alkali metal salts in solution.

* * * * *

UNITED STATES PATENT AND TRADEMARK OFFICE
CERTIFICATE OF CORRECTION

PATENT NO. : 5,840,085
DATED : November 24, 1998
INVENTOR(S) : Tokunaga et al.

It is certified that error appears in the above-identified patent and that said Letters Patent is hereby corrected as shown below:

In the Title Item [54], cancel "SODIUM CHLORIDE AND".

Column 1, in the title, cancel "SODIUM CHLORIDE AND".

In the Inventors: (Item [75]), "Nagasaki" should read -- Nagasaki-Ken --.

In the References Cited (Item [56]), U.S. PATENT DOCUMENTS, last line, "5,562,807" should read -- 5,562,804 --.

Signed and Sealed this

Fourth Day of May, 1999

*Attest:*

Q. TODD DICKINSON

*Attesting Officer*  *Acting Commissioner of Patents and Trademarks*